United States Patent
Sasaki

(12) 
(10) Patent No.: US 6,320,536 B1
(45) Date of Patent: Nov. 20, 2001

(54) GPS RECEIVER

(75) Inventor: Masahiro Sasaki, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/558,672

(22) Filed: Apr. 26, 2000

(30) Foreign Application Priority Data

Apr. 26, 1999 (JP) .................................................. 11-118499

(51) Int. Cl.$^7$ .............................. H04B 7/185; G01S 5/02
(52) U.S. Cl. .......................................................... 342/357.15
(58) Field of Search ........................................ 342/357.15

(56) References Cited

U.S. PATENT DOCUMENTS 5,663,735 * 9/1997 Eshenbach .

FOREIGN PATENT DOCUMENTS 06186317 7/1994 (JP) .
5-256925 7/1994 (JP) .

* cited by examiner

Primary Examiner—Theodore M. Blum
(74) Attorney, Agent, or Firm—Ratner & Prestia, P.C.

(57) ABSTRACT

A GPS receiver for shortening the time for locking onto a satellite includes a detector having an oscillator and plural reception channels, a navigational-message-receiver for analysing the message demodulated at the detector from a signal transmitted by a GPS satellite, a position-determiner for acquiring information of the receiver's position, a satellite-selector for selecting a receivable GPS satellite, a stationary-satellite-receiver for receiving a signal from a stationary satellite and measuring an offset frequency of the oscillator. The satellite selector sets a scanning range on a center frequency for each channel, the scanning range being formed by adding the Doppler-shift frequency to the offset frequency of the oscillator, the offset frequency being measured by the stationary-satellite-receiver. The stationary-satellite-receiver always receives signals from the stationary satellite to measure the offset frequency of the oscillator while a main power source is turned off. Therefore, the satellite selector immediately sets a correct frequency scanning range for the satellites upon turning on the main power source, thereby shortening the time for locking onto the satellite.

17 Claims, 15 Drawing Sheets

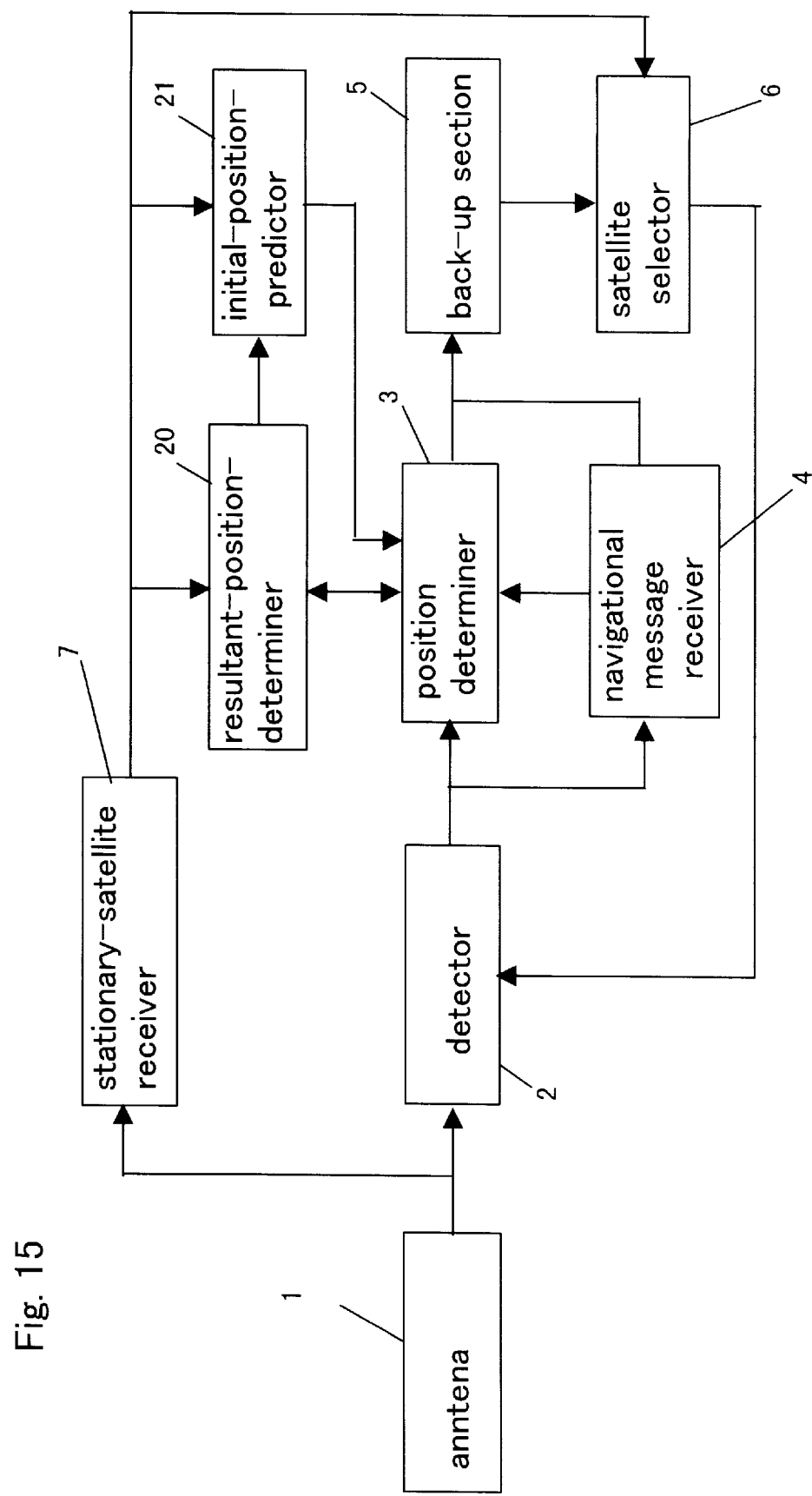

GPS RECEIVER

FIELD OF THE INVENTION

The present invention relates to Global Positioning System (GPS) receivers, and more particularly relates to a GPS receiver determining an absolute position of a mobile receiver on Earth utilising signals from a GPS satellite orbiting the earth

BACKGROUND OF THE INVENTION

A GPS receiver receives radio-waves simultaneously from plural GPS satellites, and acquires navigation messages (orbit and time information), thereby calculating its absolute position on Earth including a latitude, longitude, altitude and the like. GPS satellites transmit signals for determining positions using L1 band of 1.57542 GHz and L2 band of 1.2276 GHz. The L1 band is generally available to the public.

The carrier wave frequency of the signal transmitted with the L1 band undergoes frequency-drift by the Doppler effect due to the moving of the GPS satellite. The drift received on Earth is max. ±5,000 Hz. An internal oscillator mounted to a GPS receiver is used for detecting the carrier wave. This oscillator, in general, employs a temperature-compensated crystal oscillator. Even if a highly accurate and temperature-compensated crystal oscillator is used, there still exists an error of as little as several ppm (parts per million).

For instance, an error of 3 ppm corresponds to ±5,000 Hz, and another ±5,000 Hz due to the Doppler effect is added thereto. Thus the frequency received on Earth may drift in a range of approx. ±10,000 Hz on the carrier wave frequency 1.57242 GHz. In order to overcome this wide frequency-drift when receiving signals from a GPS satellite, a GPS receiver calculates the position of the GPS satellite based on the backed-up navigation messages including the orbit information and rough times. Then the GPS receiver estimates an offset frequency of the GPS satellite receivable from the receiver's position. The center frequency for scanning the GPS satellite is calculated by doppler frequency and scans the range of "Doppler frequency-drift+the offset frequency" on the carrier wave frequency of this GPS satellite.

A poorly accurate crystal oscillator would produce a greater error due to temperature changes, such as+several dozens ppm. For instance, an error of +10 ppm is produced when Doppler frequency-drift+offset frequency =±16,000 Hz, then the range of as wide as ±16,000 Hz on a predicted carrier wave frequency must be scanned. If this wide range can be scanned at one time, there is no problem; however, actually a narrow range such as 800 Hz is the maximum range for one scan due to restrictions of the circuit. In this case, 40 times scanning (16,000×2/800=40) is required.

Signals from a GPS satellite undergo spectrum-diffusion with pseudo random number (PRN) code. Therefore, when receiving the signals from the GPS satellite, a GPS receiver should decode the signals to be phased by the assigned PRN code which is proper to the GPS satellite and then inversely diffused. One scan for a determination per inverse diffusion takes more than one second. Thus, scanning all the frequency ranges takes more than 40 seconds and this delays the receiver to lock onto the satellite before the receiver start positioning.

PRN code is used for transmitting the time of a signal from a GPS satellite, a phase shift produced at the inverse diffusion becomes a measurement error of the satellite time. In an environment where reflections are easily produced, such as an area crowded with high-rise buildings, multi-paths due to reflections on such high-rises produce a phase-shift at the inverse diffusion. This prevents the GPS receiver from measuring a transmitting time of the signal from the satellite, thereby widening the error range for calculating a position.

GPS satellites transmit data in a "sub-frame" unit every six seconds. At the top of the sub-frame, a frame synchronising pattern (preamble pattern) coded in 8-bit is stored. The GPS receiver, first of all, needs to detect this preamble pattern. The sub-frame stores a top-time of the next sub-frame. The receiver measures the transmitting time from the GPS satellite using the time stored, a number of data bits from the top of the sub-frame, and the PRN code. Accordingly, the GPS receiver is not allowed to start calculating the position during the period from detecting the signal from the GPS satellite to acquiring the sub-frame and determining the time.

When scanning the sub-frame, because both of the preamble pattern and the time data are in eight-bit stream, the receiver may detect the time data before the preamble pattern by mistake. Dealing with this mistake takes a long time before the sub-frame can be acquired.

After acquiring the time data of respective GPS satellites, simultaneous equations of the spheres centering respective satellites' positions are established, and these two-dimensional equations are solved, so that the GPS receiver calculates its own position. In a GPS receiver, an unknown is expressed by a sum of an approximate value and a corrected value. The corrected value is developed to be negligible and is neglected in the orders which are higher than the second order, then simultaneous first power equations are solved by a successive approximation method. This calculation is repeated until the necessary accuracy is obtained. However, when a position is determined utilising a minimum of three satellites' signals where the centre of Earth is deemed a pseudo satellite, the approximated value is sometimes far from a true position. The calculations thus result in wrong positioning.

SUMMARY OF THE INVENTION

The present invention addresses the problems discussed above, and aims to provide a GPS receiver that shortens the start-up time before starting calculations for positioning and reduces calculation errors.

Thus, the present invention concerns a Global Positioning System (GPS) receiver as defined in the appended claims.

This structure allows the GPS receiver to receive a signal from the stationary satellite of a GPS wide area reinforcing system (such as GPS-WAAS) and always monitor as well as predict the offset frequency of the oscillator, thereby acquiring an exact scanning frequency. As a result, the time for locking onto a satellite can be drastically reduced.

BRIEF DESCRIPTION OF THE DRAWING

FIG. 15 is a block diagram depicting functions of a GPS receiver in accordance with a 15th exemplary embodiment of the present invention.

DESCRIPTION OF THE EXEMPLARY EMBODIMENT

Exemplary embodiments of the present invention are demonstrated hereinafter with reference to th e accompanying drawings.

1. First Exemplary Embodiment

In this embodiment, a GPS receiver having a main power source is in power-off mode and receives a signal from a stationary satellite of a GPS wide-area assisting system using a back-up power source, and finds an offset frequency of its crystal oscillator, thereby establishing a centre frequency of scanning range.

Figure 1:
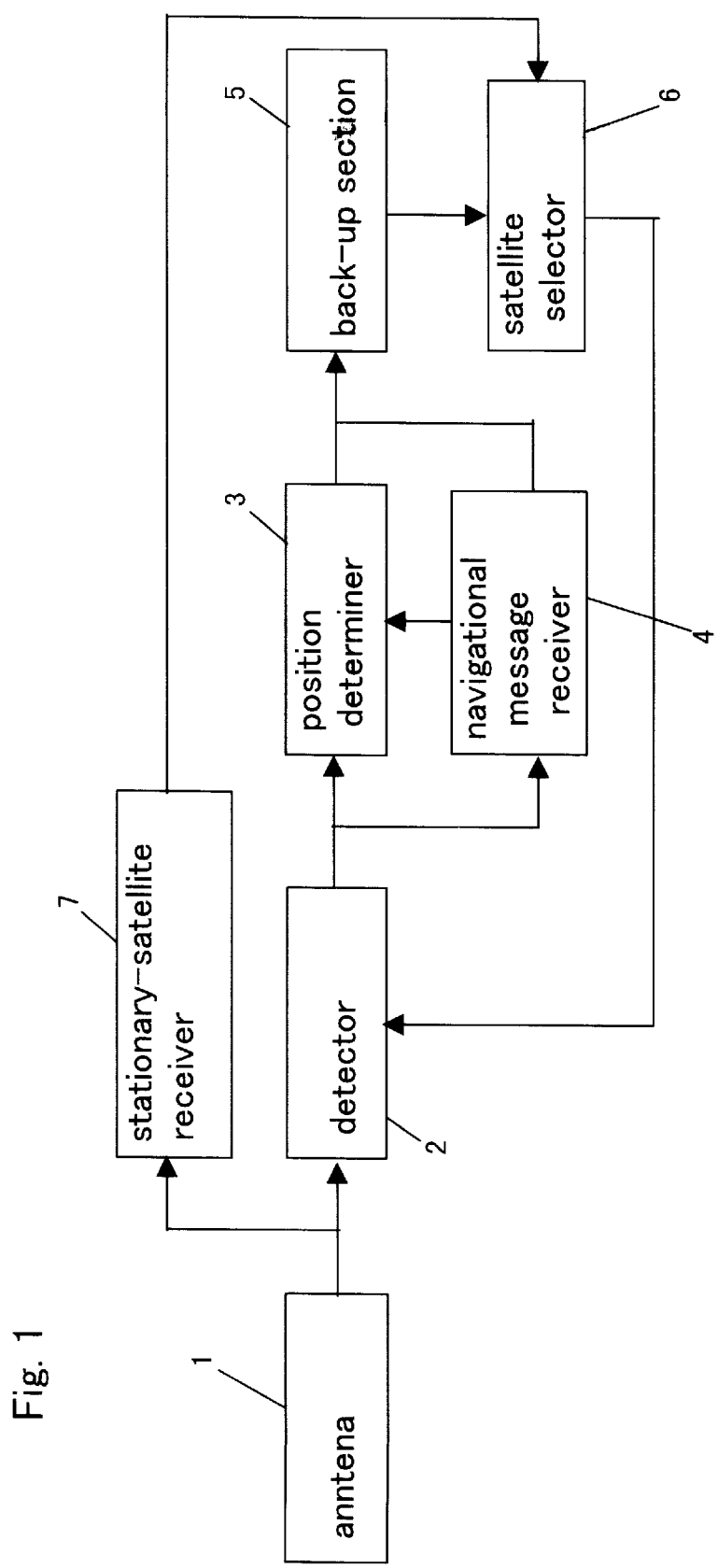
FIG. 1 is a block diagram depicting functions of a GPS receiver in accordance with a first exemplary embodiment of the present invention.

FIG. 1 is a block diagram illustrating a structure and functions of the GPS receiver in accordance with the first embodiment of the present invention. In FIG. 1, antenna 1 receives radio-waves from a GPS satellite and feeds it to detector 2, and also receives radio-waves from a stationary satellite of the GPS wide-area assisting system and feeds it to stationary-satellite-receiver 7. Detector 2 has a built-in crystal oscillator for reusing a carrier wave. Detector 2 demodulates the radio wave received by antenna 1 based on the frequency of the carrier wave revived by this crystal oscillator, and acquires data transmitted from the GPS satellite. The data acquired by detector 2 undergoes a frame detection, data collection and analysis at -message receiver 4 so that a navigational message including orbit information and time data can be obtained.

Position determiner 3 uses the orbit information and time data of the satellite, obtained at navigational message receiver 4, and calculates the position of the GPS receiver. The position calculated at determiner 3 and the navigational message are stored in back-up section 5. Satellite selector 6 predicts a receivable GPS satellite and the Doppler-shift frequency based on the position of the receiver and the navigational message stored, then detector 2 selects the receivable GPS satellite. Selector 6 then sets the satellite number and an initial centre frequency of scanning range in respective channels of detector 2. Stationary-satellite-receiver 7 receives a signal from the stationary satellite of the GPS wide-area assisting system and measures the offset frequency of the crystal oscillator. More descriptions are detailed later.

A GPS satellite transmits data on a carrier wave of 1.57542 GHz, and this carrier wave includes a frequency-drift due to the Doppler effect caused by the moving of the satellite and an offset frequency due to a temperature error of the crystal oscillator in detector 2. Therefore, a range of ±10,000 Hz with the centre frequency being 1.57542 GHz must be scanned.

As of today, twenty-four GPS satellites are provided in total, i.e. four satellites are provided respectively on six orbits. Besides these GPS satellites, the GPS wide-area assisting system is arranged to broadcast integrity information and a Differential Global Positioning System (DGPS) from its stationary satellite. This information is receivable without fail in a certain area on Earth as long as any obstacles, such as a high-rise building or a roof, do not block the radio waves because the satellite is stationary. The stationary satellite also transmits its signals at the same frequency as that from the GPS satellite and they are modulated by the same type of PRN code, this information can be received by approx. the same hardware as a conventional GPS receiver.

In this regard, as shown in FIG. 1, stationary satellite receiver 7 for receiving a signal from the stationary satellite using the back-up power source is provided when the GPS receiver is in power-off mode. Since the stationary satellite is free from the Doppler effect because it does not move, the difference between the frequency received and the carrier frequency of 1.57542 GHz is treated as the offset frequency of the crystal oscillator. Therefore, when the main power is turned on, the center frequency determined at satellite selector 6 is determined by using this offset frequency received from the stationary satellite. This process allows the receiver to determine accurately the scanning center frequency. As a result, even if an inexpensive and poorly accurate crystal oscillator is used, the receiver can be immediately ready to receive radio waves from a GPS satellite upon power-on, so that the start-up time of the receiver can be shortened.

2. Second Exemplary Embodiment

A GPS receiver in accordance with the second exemplary embodiment measures an offset frequency by activating a stationary-satellite-receiver at a given time intervals.

Figure 2:
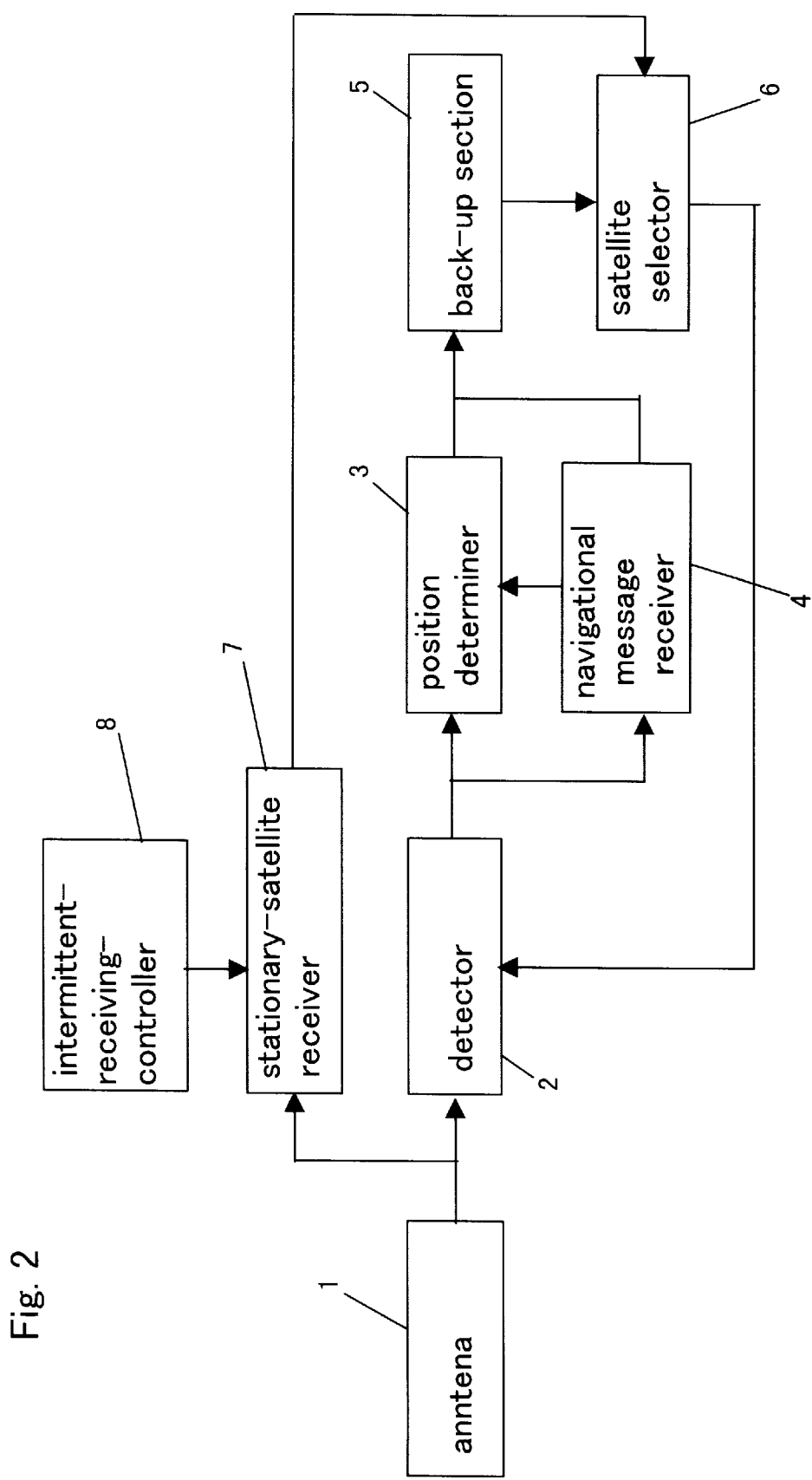
FIG. 2 is a block diagram depicting functions of a GPS receiver in accordance with a second exemplary embodiment of the present invention.

FIG. 2 is a block diagram illustrating a structure and functions of the GPS receiver used in the second embodiment. The same sections already illustrated in FIG. 1 are denoted with the same reference marks, and the descriptions thereof are thus omitted here. This embodiment differs from the first one by providing intermittent receiving controller 8, which periodically operates stationary-satellite-receiver 7.

Since the stationary satellite is free from the Doppler effect because it does not move, the frequency at which a signal is received from the stationary satellite is handled as the offset frequency of the crystal oscillator. At the start-up time, the GPS receiver may predict the offset frequency of the crystal oscillator in satellite selector 6. The offset frequency varies gradually mainly by following the temperature change, therefore, stationary satellite receiver 7 is not needed to continuously monitor the offset frequency, but can measure it periodically. Intermittent-receiving-controller 8 thus activates receiver 7 at given intervals to measure the offset frequency. As a result, stationary-satellite-receiver 7 operates intermittently, thereby reducing the power consumption of the back-up power source.

3. Third Exemplary Embodiment

A GPS receiver in accordance with the third exemplary embodiment measures a change rate of offset frequency periodically, and predicts the offset frequency based on an elapsed time and the change rate when a main power source is turned on.

Figure 3:
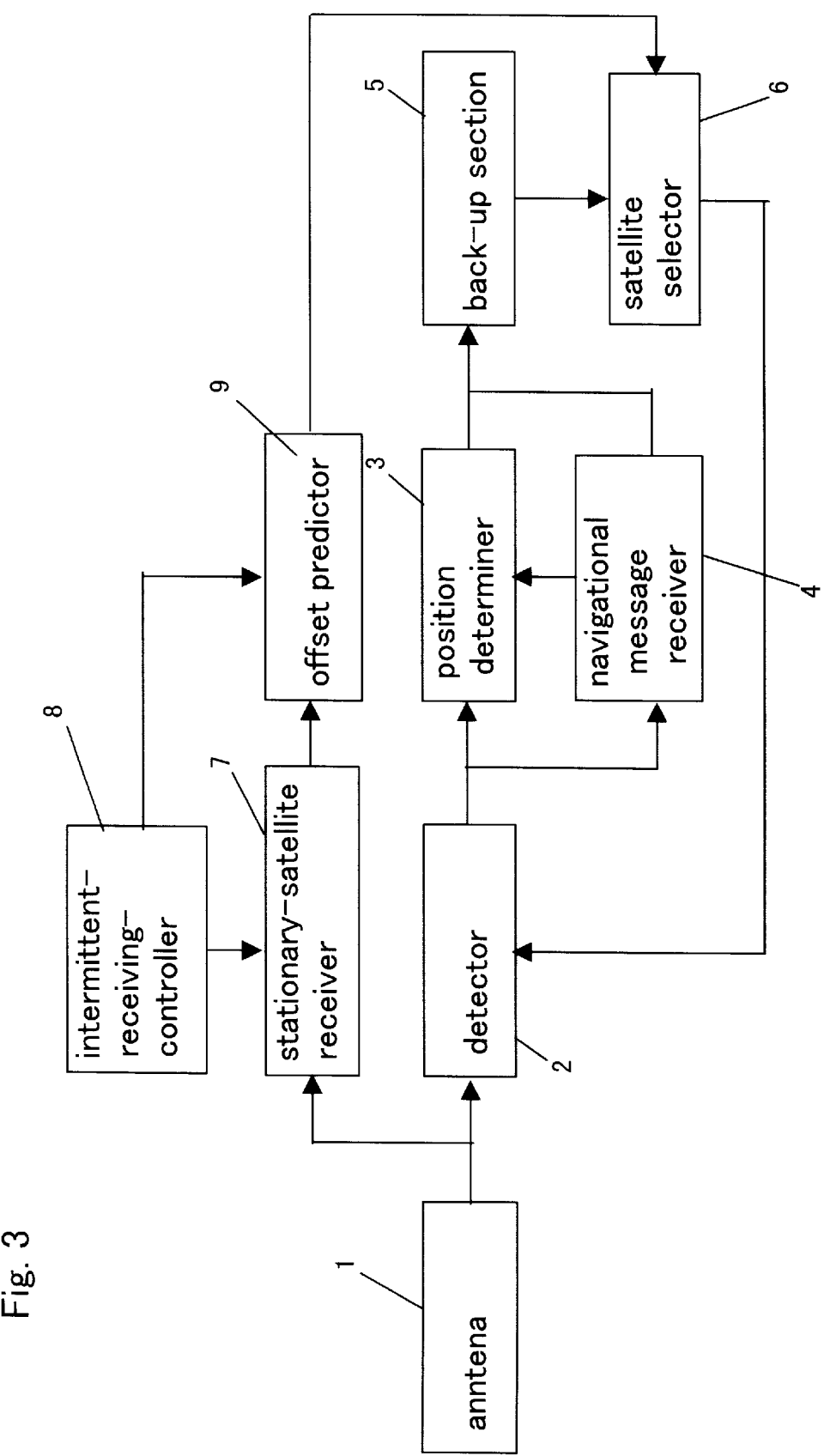
FIG. 3 is a block diagram depicting functions of a GPS receiver in accordance with a third exemplary embodiment of the present invention.

FIG. 3 is a block diagram illustrating a structure and functions of the GPS receiver used in the third embodiment. The same sections already illustrated in FIG. 2 are denoted with the same reference marks, and the descriptions thereof are thus omitted here. This embodiment differs from the second one by providing offset predictor 9, which finds a change rate of an offset frequency based on a predicted offset frequency and an interval of receiving a signal from a stationary satellite.

The offset frequency of a crystal oscillator changes with time and with temperature; however, concerning the changes with time, the elapsed time is only little. Thus the change of offset frequency received by stationary-satellite-receiver 7 is mainly the change thereof with temperature. A change amount (slant) can be found at intermittent receiving intervals set by controller 8. The offset frequency sometimes does not change linearly with respect to temperature changes depending on the characteristics of the crystal oscillator; however these two factors, i.e. a temperature change and the offset frequency, can be in a proportional relation during a short period. The temperature change of the crystal oscillator is thus proportional to the time change during the short period.

The change of offset frequency with time can be thus predicted based on the offset frequency measured previously, its slant and the elapsed time. Offset predictor 9 thus periodically measures the change rate of the offset frequency based on the offset frequency which is periodically measured by stationary-satellite-receiver 7 and on the time intervals of measuring the offset frequency. Then predictor 9 stores the measured data in addition to the times when the offset frequencies were measured. When the main power source is turned on, the offset frequency upon power-on can be accurately predicted using the following three factors: (1) a change amount of the predicted offset frequency from an elapsed time from the measuring of the offset frequency, (2) a change rate of the offset frequency and (3) the offset frequency measured most recently. In other words, the intervals between respective receptions of signals from the stationary satellite are extended, and an accurate prediction of the offset frequency is still maintained, thereby reducing the power consumption of the back-up power source.

4. Fourth Exemplary Embodiment

A GPS receiver in accordance with the fourth exemplary embodiment lengthens an interval of intermittent receiving at less change amount of an offset frequency.

Figure 4:
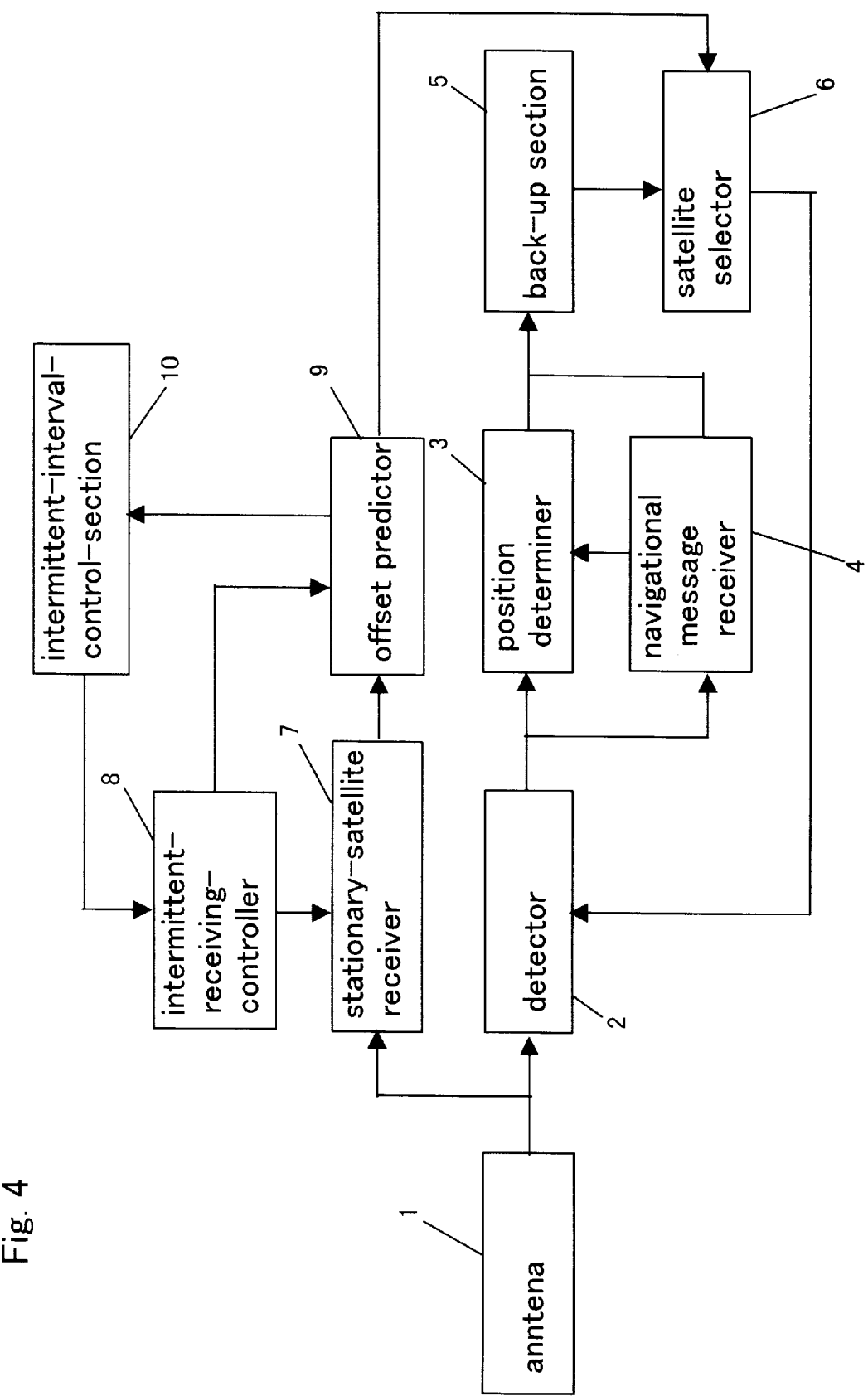
FIG. 4 is a block diagram depicting functions of a GPS receiver in accordance with a fourth exemplary embodiment of the present invention.

FIG. 4 is a block diagram illustrating a structure and functions of the GPS receiver used in the fourth embodiment. The -same sections already illustrated in FIG. 3 are denoted with the same reference marks, and the descriptions thereof are thus omitted here. This embodiment differs from the third one by providing intermittent-interval-control section 10, which controls the interval of the intermittent receptions performed by intermittent-receiving-controller 8.

The offset frequency of a crystal oscillator changes with time and with temperatures. The change with time needs a long span of time and does not vary so much within a short span. On the contrary, the temperature of the oscillator changes the offset frequency within a short span. During a short span following the power-off of the main power source, the crystal oscillator cools down sharply, and finally stays at a certain temperature, i.e. an ambient temperature. After that, the temperature of the oscillator changes responsive to the change of ambient temperature. Accordingly, the offset frequency of the crystal oscillator changes drastically responsive to the temperature change during the initial stage after power-off. However, once the temperature more or less stabilises at a certain level, the offset frequency does not change so much, and thus a longer interval between each measuring of the offset frequency does not affect so much the accuracy of prediction at offset predictor 9.

Intermittent-interval-control-section 10 thus extends the interval between intermittent receptions inversely to the change amount of the offset frequency, based on the offset-change-amount found by offset predictor 9. As a result, the power consumption of the back-up power source can be further reduced.

5. Fifth Exemplary Embodiment

A GPS receiver in accordance with the fifth exemplary embodiment scans the stationary satellite in every channel having respective different centre frequencies when the GPS receiver determines that the offset frequency of a crystal oscillator are not predicted.

Figure 5:
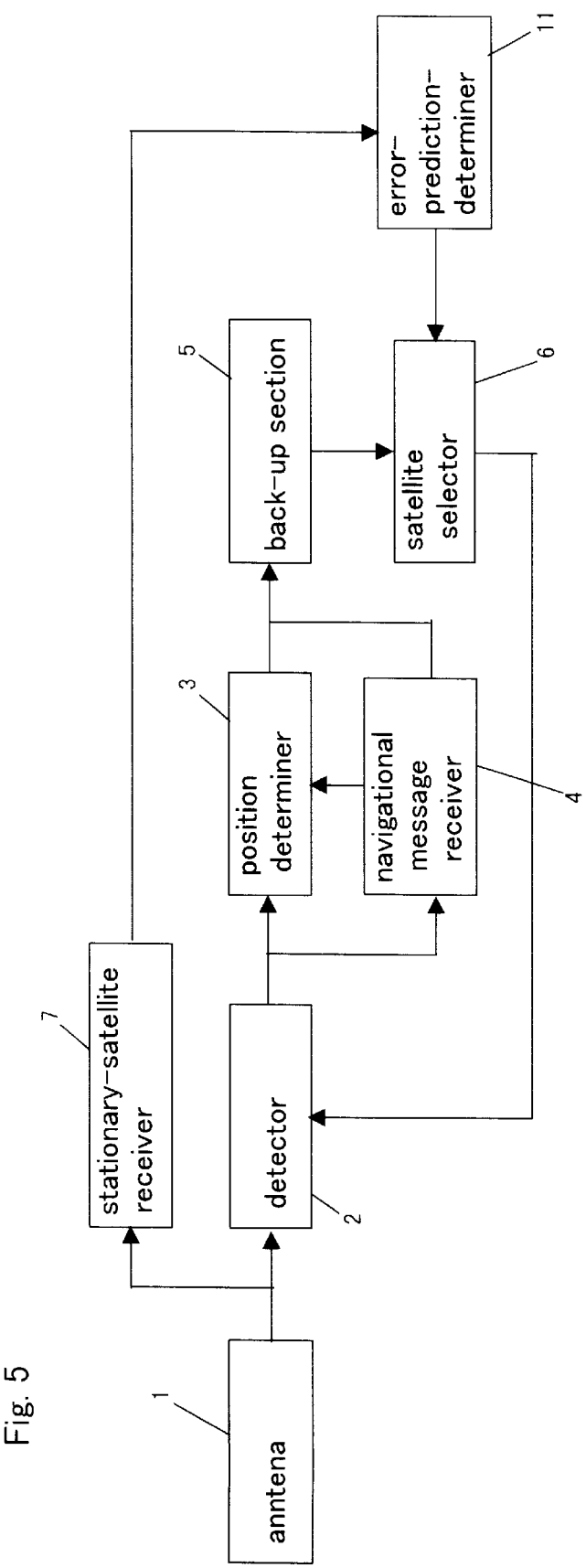
FIG. 5 is a block diagram depicting functions of a GPS receiver in accordance with a fifth exemplary embodiment of the present invention.

FIG. 5 is a block diagram illustrating a structure and functions of the GPS receiver used in the fifth embodiment. The same sections already illustrated in FIG. 1 are denoted with the same reference marks, and the descriptions thereof are thus omitted here. This embodiment differs from the first one by providing error-prediction-determiner 11, which determines whether or not stationary-satellite-receiver 7 successfully predicts the offset frequency.

When obstacles exist between the stationary satellite and the GPS receiver depending on the location of a building or a parking area, near which the receiver is placed, it is difficult to receive signals from the satellite. As a result, the offset frequency is not predictable, and this results in scanning a wide range of frequencies.

Since the stationary satellite is free from frequency drift due to the Doppler effect that occurs for a moving satellite, the scanning range is just limited to the offset frequency of the oscillator when a signal from the stationary satellite is received. The stationary satellite employed in the GPS wide-area assisting system transmits a signal on a carrier wave having the same frequency as that of the GPS satellite, thus every channel of detector 2 can receive signals from the stationary satellite.

Error-prediction-determiner 11 thus allows every channel of detector 2 to scan the stationary satellite with different centre frequencies respectively when determining that the offset frequency of the crystal oscillator is not predictable. When at least one channel can receive the stationary satellite, the offset frequency of the oscillator can be measured. After the offset frequency is measured, a center frequency is established as follows and thus the GPS receiver can receive the signals from the satellite without center frequency frequencies. The scanning range is established by adding the offset frequency to the predicted Doppler-shift frequency calculated from orbit-information of respective GPS satellites.

6. Sixth Exemplary Embodiment

A GPS receiver in accordance with the sixth exemplary embodiment determines a level of reference signal of respective GPS receivers by measuring a level of a signal from the stationary satellite for a given period.

Figure 6:
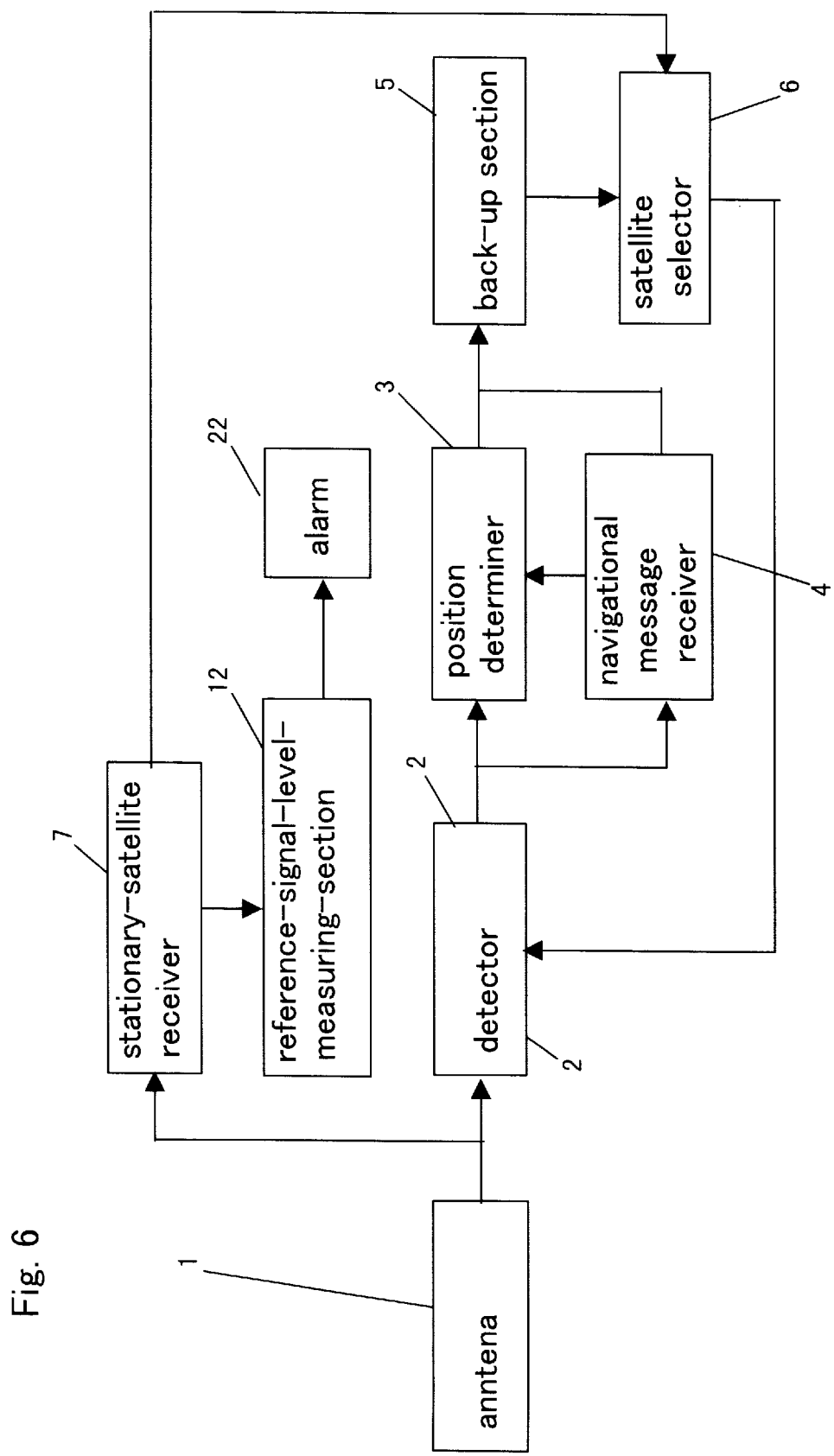
FIG. 6 is a block diagram depicting functions of a GPS receiver in accordance with a sixth exemplary embodiment of the present invention.

FIG. 6 is a block diagram illustrating a structure and functions of the GPS receiver used in the sixth embodiment. The same sections already illustrated in FIG. 1 are denoted with the same reference marks, and the descriptions thereof are thus omitted here. This embodiment differs from the first one by providing reference-signal-level-measuring section 12, which measures for a long time continuously the signal level measured at stationary-satellite-receiver 7, thereby determining the level of a reference signal of the stationary satellite.

As long as the receiver itself does not move so much, the stationary satellite shows a constant orientation and a constant elevation angle, therefore, the level of the signal received from the satellite also stays at a constant level. Reference-signal-level-measuring-section 12 thus measures the level of the signal from the stationary satellite over a given period, so that measuring section 12 can determine the reference-signal-level of the respective GPS receivers. When the reference signal level is distinctly too small or varies in a large amount, something is wrong in antenna 1 or the receiver itself. In such a case, alarm 22 warns users or a higher level device of an abnormal condition, so that a diagnostic decision is immediately made and the abnormal condition is solved within a shorter time.

7. Seventh Exemplary Embodiment

A GPS receiver in accordance with the seventh exemplary embodiment determines a threshold level for determining a signal-detection based on the reference-signal-level measured.

Figure 7:
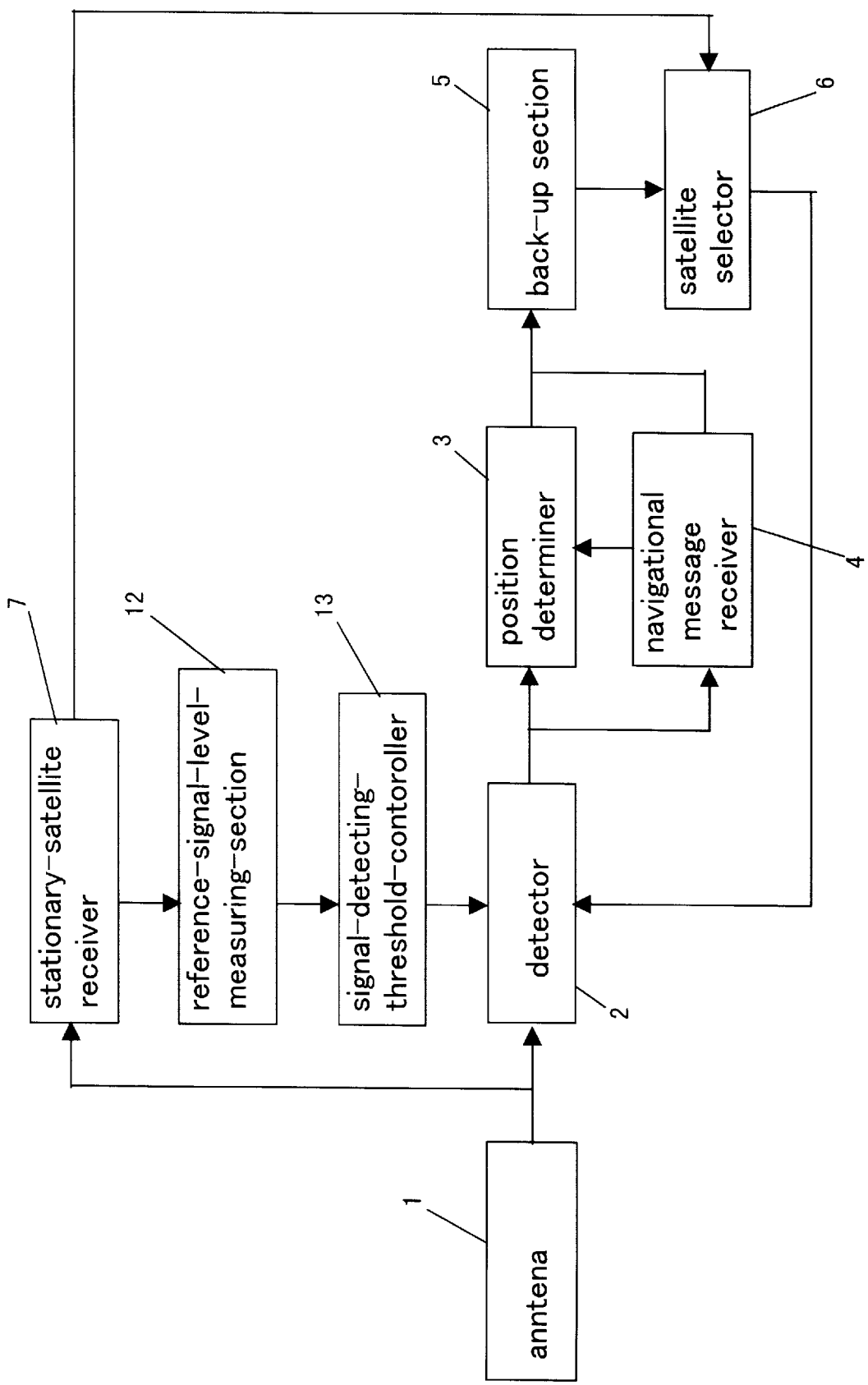
FIG. 7 is a block diagram depicting functions of a GPS receiver in accordance with a seventh exemplary embodiment of the present invention.

FIG. 7 is a block diagram illustrating a structure and functions of the GPS receiver used in the seventh embodiment. The same sections already illustrated in FIG. 6 are denoted with the same reference marks, and the descriptions thereof are thus omitted here. This embodiment differs from the sixth one by removing alarm 22 and providing signal-detecting-threshold controller 13, which determines a threshold value for a signal detection at detector 2 based on the reference-signal-level measured by reference-signal-level-measuring-section 12.

When a GPS receiver demodulates a signal from a GPS satellite, the phase of the PRN code is not known. Thus the signal is inversely diffused by shifting the phase at a certain scanning pitch, and the signal detection is determined by whether or not a relative value greater than a reference value is output. The reference value is referred to as a "signal-detecting-threshold-value". Theoretically, the ratio of the relative value at agreement of phases vs. that at non-agreement of phases is not more than 1024 vs. 60, and when the phase shift is within ±1 pitch, the relative value changes in proportion to the phase-shift amount. For instance, if a signal is detected at the phase shift within ±1/2 pitches, a half of the maximum relative value can be set as a signal-detecting-threshold-value.

However, when the GPS receiver receives signals from satellites in reality, noise carried by the signals and produced by the receiver and the directivity of an antenna must be taken into consideration before the signal-detecting-threshold-value is determined. For instance, when the threshold value is too small, noise on a signal causes the signal to overflow the threshold, thereby repeating erroneous detection. On the contrary, when the threshold is too high, a satellite with a low elevation angle transmits a low-level signal, which may possibly not be received.

Regarding the relation between the reference-signal-level and the signal-detecting signal-detecting-threshold-value, the reference-signal-level should be measured in advance under a plurality of conditions including the directivity of the antenna. Then a relation of the signal-detecting-threshold optimised with respect to the measured reference-signal-level is searched and stored. Signal-detecting-threshold-value controller 13 thus determines a signal-detecting-level optimum for the measured reference-signal-level based on the relation already stored. Detector 2 detects a signal using this signal detecting level. This structure determines a signal-detecting-threshold value without being affected by external factors such as the directivity of the antenna, noise and the like.

8. Eighth Exemplary Embodiment

A GPS receiver in accordance with the eighth exemplary embodiment determines whether or not a GPS satellite is useful for determining the position of the receiver based on a reference-signal-level measured.

Figure 8:
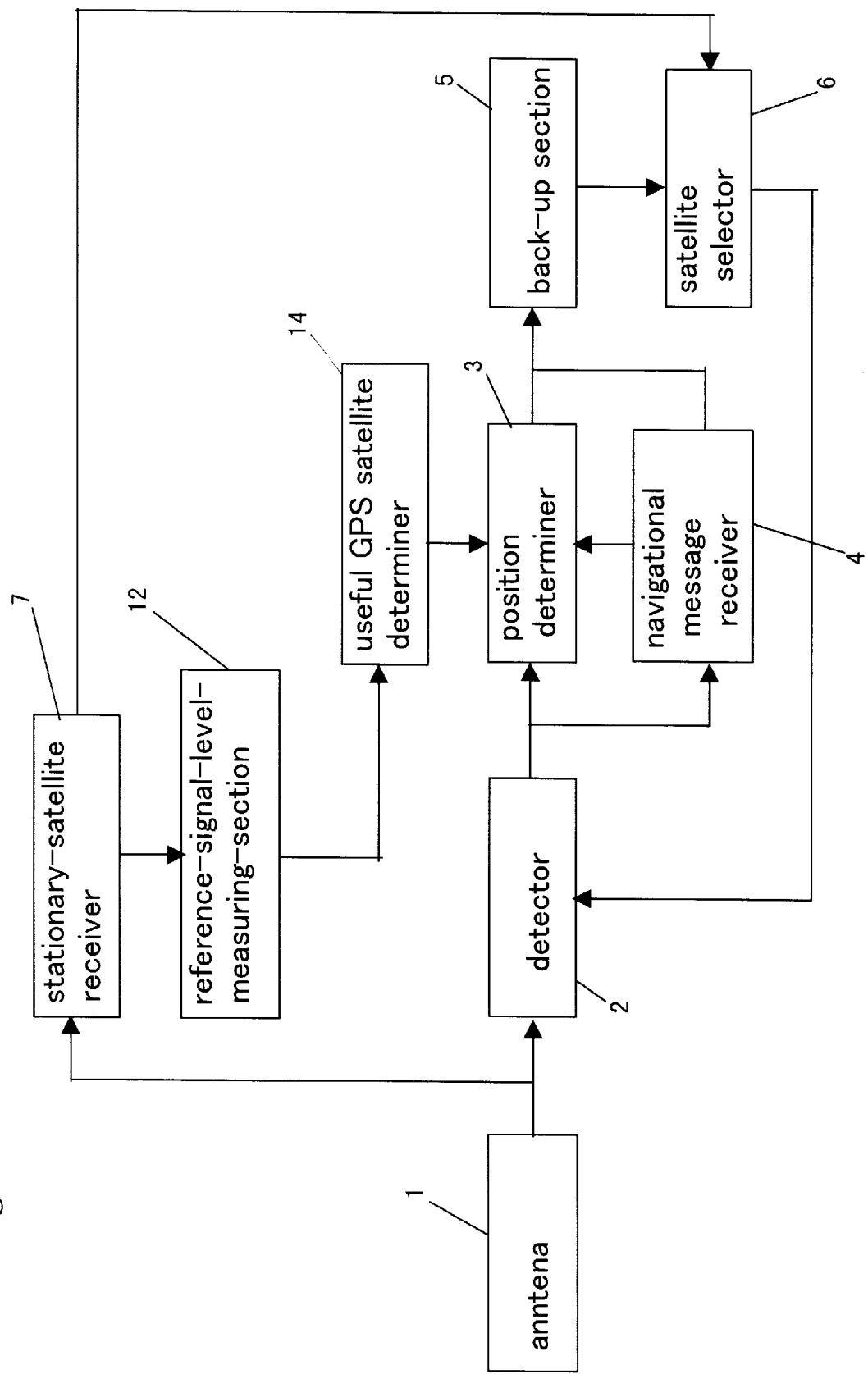
FIG. 8 is a block diagram depicting functions of a GPS receiver in accordance with an eighth exemplary embodiment of the present invention.

FIG. 8 is a block diagram illustrating a structure and functions of the GPS receiver used in the eighth embodiment. The same sections already illustrated in FIG. 6 are denoted with the same reference marks, and the descriptions thereof are thus omitted here. This embodiment differs from the sixth one by removing alarm 22 and providing useful GPS satellite determiner 14, which determines whether or not a GPS satellite is useful for determining the position of the receiver based on a reference-signal-level.

In an area crowded with high-rise buildings, signals from a GPS satellite reflect off walls of the high-rises, and the reflection waves are tracked to measure. A resulting measured position sometimes includes a large error. On the other hand, the level of a signal from a stationary satellite stays almost still. Thus, depending on the reference-signal-level measured by measuring-section 12, the signal level to be received from each GPS satellite is predictable by an orientation and elevation angle found from the position of each GPS satellite as well as the directivity of the antenna.

In general, when the reflection waves are tracked, the signal level tends to be smaller than when a direct wave is tracked. When the signal level measured by measuring section 12 is distinctly different from the signal level from a GPS satellite, useful GPS satellite determiner 14 determines that the signal from the GPS satellite is not a direct wave and prohibits the receiver from using this particular GPS satellite for positioning. As a result, signals other than the signal on a direct wave are not used for calculating the position of the receiver.

9. Ninth Exemplary Embodiment

A GPS receiver in accordance with the ninth exemplary embodiment determines whether or not a stationary satellite is useful for calculating the position of the receiver based on a reference-signal-level measured.

Figure 9:
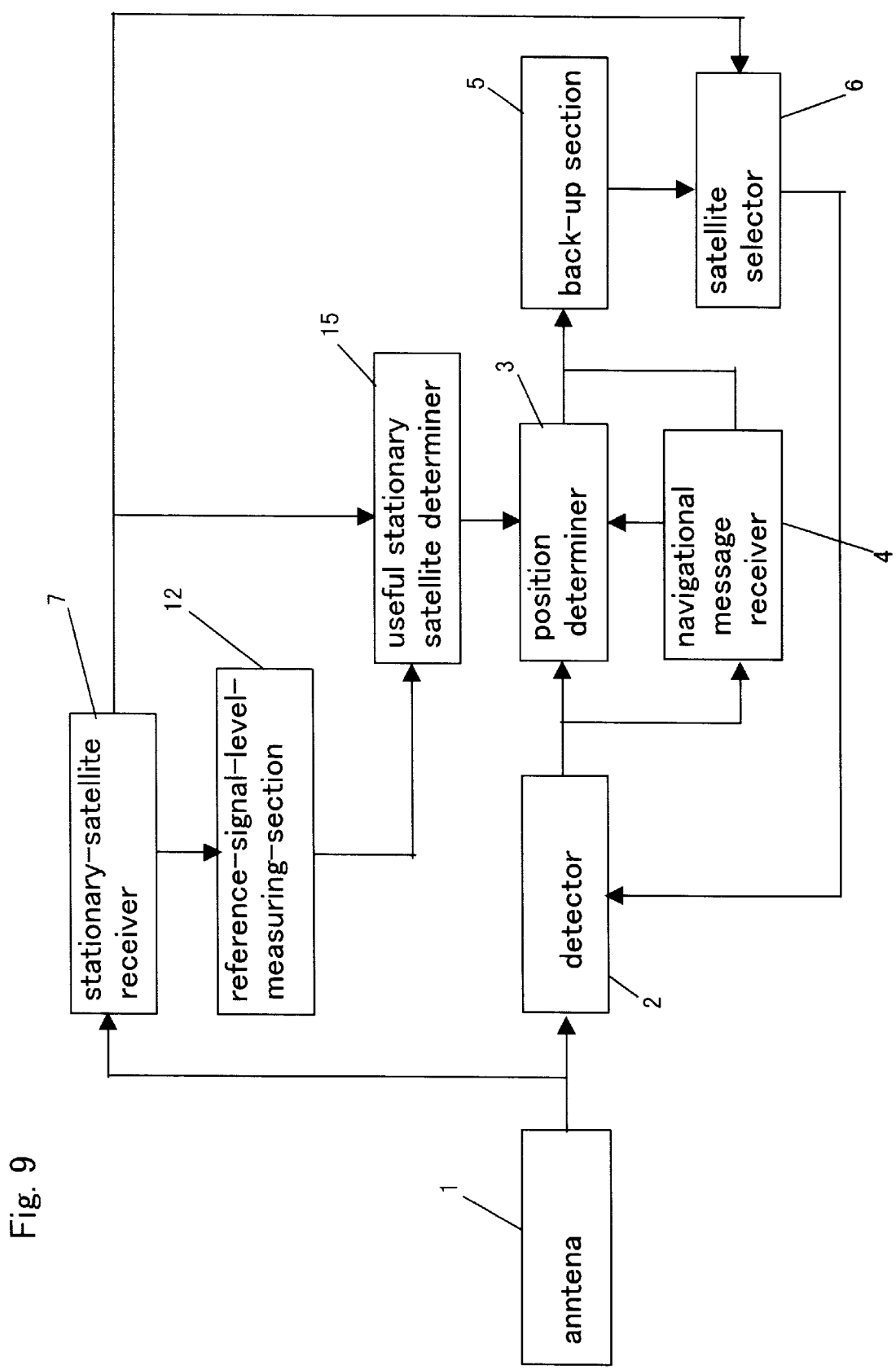
FIG. 9 is a block diagram depicting functions of a GPS receiver in accordance with a ninth exemplary embodiment of the present invention.

FIG. 9 is a block diagram illustrating a structure and functions of the GPS receiver used in the ninth embodiment.

The same sections already illustrated in FIG. 6 are denoted with the same reference marks, and the descriptions thereof are thus omitted here. This embodiment differs from the sixth one by removing alarm 22 and providing useful stationary satellite determiner 15, which determines whether or not a stationary satellite is useful for calculating the position of the receiver based on a reference-signal-level measured by reference-signal-level-measuring-section 12.

A stationary satellite, as well as a GPS satellite, can be used for calculating the position of the GPS receiver. In this case, reflection waves reflected off walls of high-rises are sometimes received, and this could somewhat lower the positioning accuracy.

When the stationary satellite is used for the calculation, the wave reflected off high-rises contains a signal having a level distinctly lower than that of a direct wave. Useful-stationary-satellite-determiner 15 thus compares the signal level instantly received with a reference-signal-level measured by reference-signal-level-measuring-section 12. When the comparison results in a distinct difference, determiner 15 determines that the receiver receives a reflection wave from the stationary satellite now locked onto. As a result, determiner 15 prohibits the receiver from using abnormal signals transmitted from the stationary satellite for the positioning calculation.

10. Tenth Exemplary Embodiment

A GPS receiver in accordance with the tenth exemplary embodiment limits a scanning range of a top data of a navigational message using measured time data.

Figure 10:
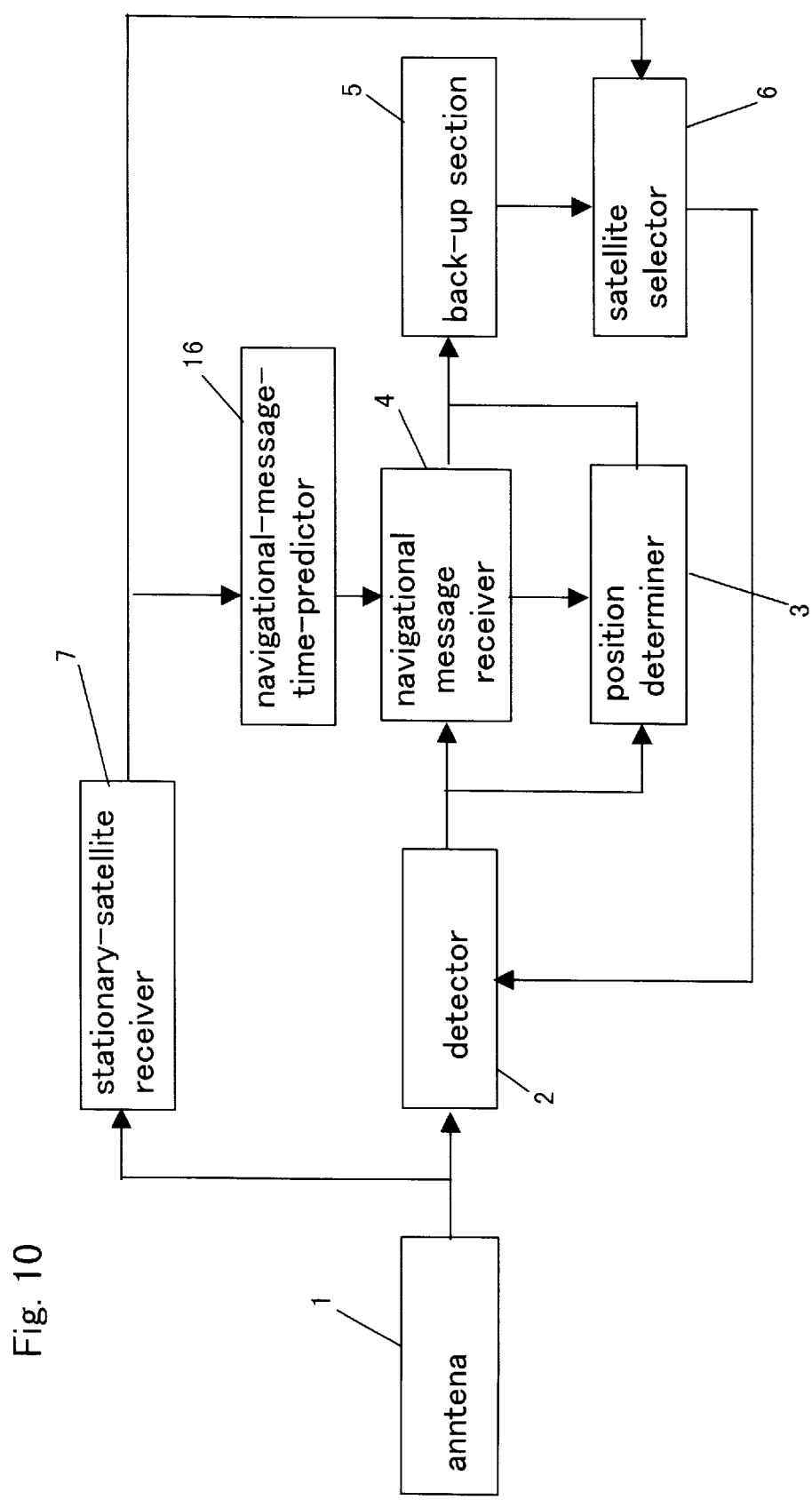
FIG. 10 is a block diagram depicting functions of a GPS receiver in accordance with a tenth exemplary embodiment of the present invention.

FIG. 10 is a block diagram illustrating a structure and functions of the GPS receiver used in the tenth embodiment. The same sections already illustrated in FIG. 1 are denoted with the same reference marks, and the descriptions thereof are thus omitted here. This embodiment differs from the first one by providing navigational-message-time-predictor 16, which establishes a scanning range of the top data of a navigational message available in navigational-message-receiver 4 using the measured time data at stationary-satellite -receiver 7.

GPS receiver must know the exact time when a GPS satellite transmits signals in order to calculate a measuring position. Transmitting times of GPS satellites are stored in navigational messages every six seconds. A time shorter than six seconds and in 20 msec units can be found by counting the number of data bits from the top of the navigational message. Further, a time shorter than 20 msec and in one msec units can be found by counting the number of occurrences of PRN codes from a data bit edge. A time shorter than one msec can be found with the phases of the PRN code.

The transmitting times of respective satellites are not available before the receiver obtains navigational messages. The navigational message is transmitted in a unit of a sub-frame formed by 300 bits at six seconds cycle. The top of every sub-frame includes time in a six-second unit. It is necessary to detect a synchronous-detecting-pattern formed by 8-bit for receiving the sub-frame, and it is also necessary to determine whether or not the detected sub-frame is valid. For instance, it takes approx. seven seconds to confirm whether or not the synchronous-detecting-pattern has been stored in the next sub-frame after the 300 bits.

The data transmitted from a stationary satellite includes time data. The distance from a rough position of the receiver to the stationary satellite is found, so that the travel time is calculated backward by the time data included in the signal from the stationary satellite. Then the present time can be roughly calculated. Navigational-message-time-predictor 16 predicts the time when the receiver receives the top of a sub-frame based on the rough position of the receiver and the position of the stationary satellite, and establishes a scanning range, then supplies the range to navigational-message-receiver 4. Navigational-message-receiver 4 scans a synchronous-detecting-pattern stored at the top of the sub-frame using the scanning range, thereby detecting the top of the sub-frame free from erroneous detection.

11. Eleventh Exemplary Embodiment.

A GPS receiver in accordance with the 11th exemplary embodiment receives a signal from a stationary satellite while the main power is off, thereby predicting present time.

Figure 11:
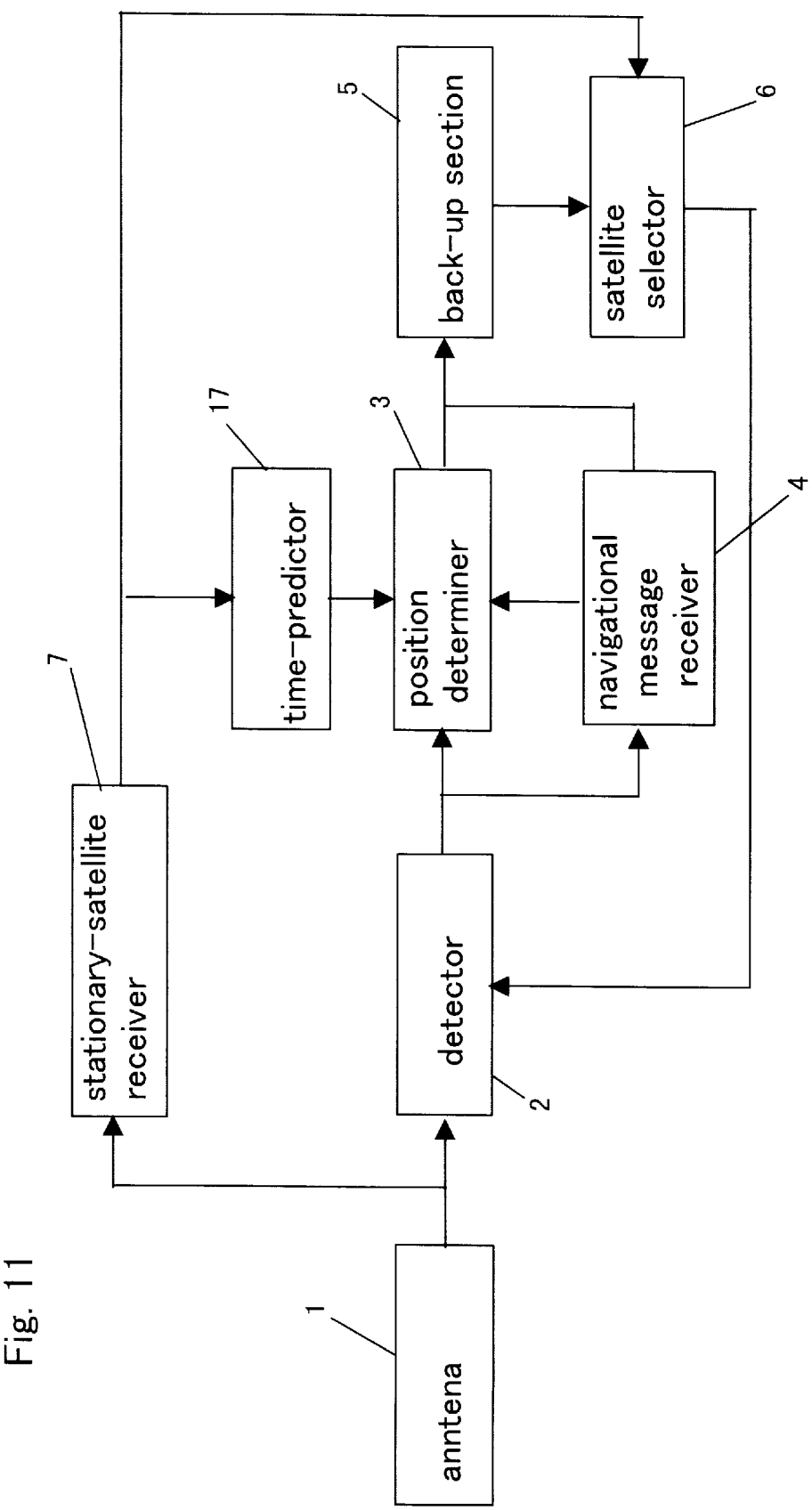
FIG. 11 is a block diagram depicting functions of a GPS receiver in accordance with an 11th exemplary embodiment of the present invention.

FIG. 11 is a block diagram illustrating a structure and functions of the GPS receiver used in the 11th embodiment. The same sections already illustrated in FIG. 1 are denoted with the same reference marks, and the descriptions thereof are thus omitted here. This embodiment differs from the first one by providing time-predictor 17, which predicts the present time of receiving a signal from a stationary satellite while the main power source is turned off.

The stationary satellite employed in a GPS wide-area assisting system (referred to as MSAS in Japan, WAAS in the USA, and DGPS in Europe) transmits signals including time data, so that the receiver can find the exact transmitting time when the information was sent out from the satellite. Further, the receiver figures out the position of the stationary satellite, finds the distance from the receiver to the satellite then calculates the travelling time. Finally, the receiver figures out the instant time when the receiver receives the time data by adding the travelling time to the transmitting time already received.

A GPS receiver needs to receive signals simultaneously from at least three satellites to measure its position, and yet, the receiver needs to calculate the exact transmitting time of respective satellites. The receiver must receive a navigational message from each satellite for figuring out the exact transmitting time. The time data longer than a unit of 20 msec exists at the top of the navigational message transmitted every six seconds, thus the top of every message must be received. The time data in a unit of one msec can be identified by detecting a bit-edge of the navigational message transmitted in 50 bps format.

Meanwhile, GPS satellites are orbiting approx. 20,000 km above Earth. The distance from a point where a satellite signal is receivable to the satellite ranges from approx. 20,000 km to 23,500 km.

In the case that the data-bit-edge is detected and the transmitting time of a unit of one msec is fixed, time-predictor 17 predicts the time of the receiver, first of all, utilising the receiver's time found by the transmitting time and the travelling time of the signal. Based on the predicted time longer than a unit of 20 msec, time-predictor 17 predicts the transmitting time longer than a unit of 20 msec of the respective GPS satellites so that the difference between the predicted receiver's time and the transmitting time of each GPS satellite falls within a range of 20,000 km–23,500 km. The travelling distance of radio waves during 20 msec is approx. 6,000 km, therefore the travelling time required for a range of 20,000 km–23,500 km is exactly predictable. As a result, detecting only a data-bit-edge in a unit of 20 msec allows the receiver to calculate the transmitting time without receiving a top of the navigational message transmitted every six seconds.

As such, this structure allows time-predictor 17 to predict the present time by receiving a signal from the stationary satellite while the main power is turned off, so that the exact present time is figured out.

12. Twelfth Exemplary Embodiment

A GPS receiver in accordance with the 12th exemplary embodiment compares the present time predicted by the data from a stationary satellite with another present time found by positional calculation, thereby determining if an abnormality exists.

Figure 12:
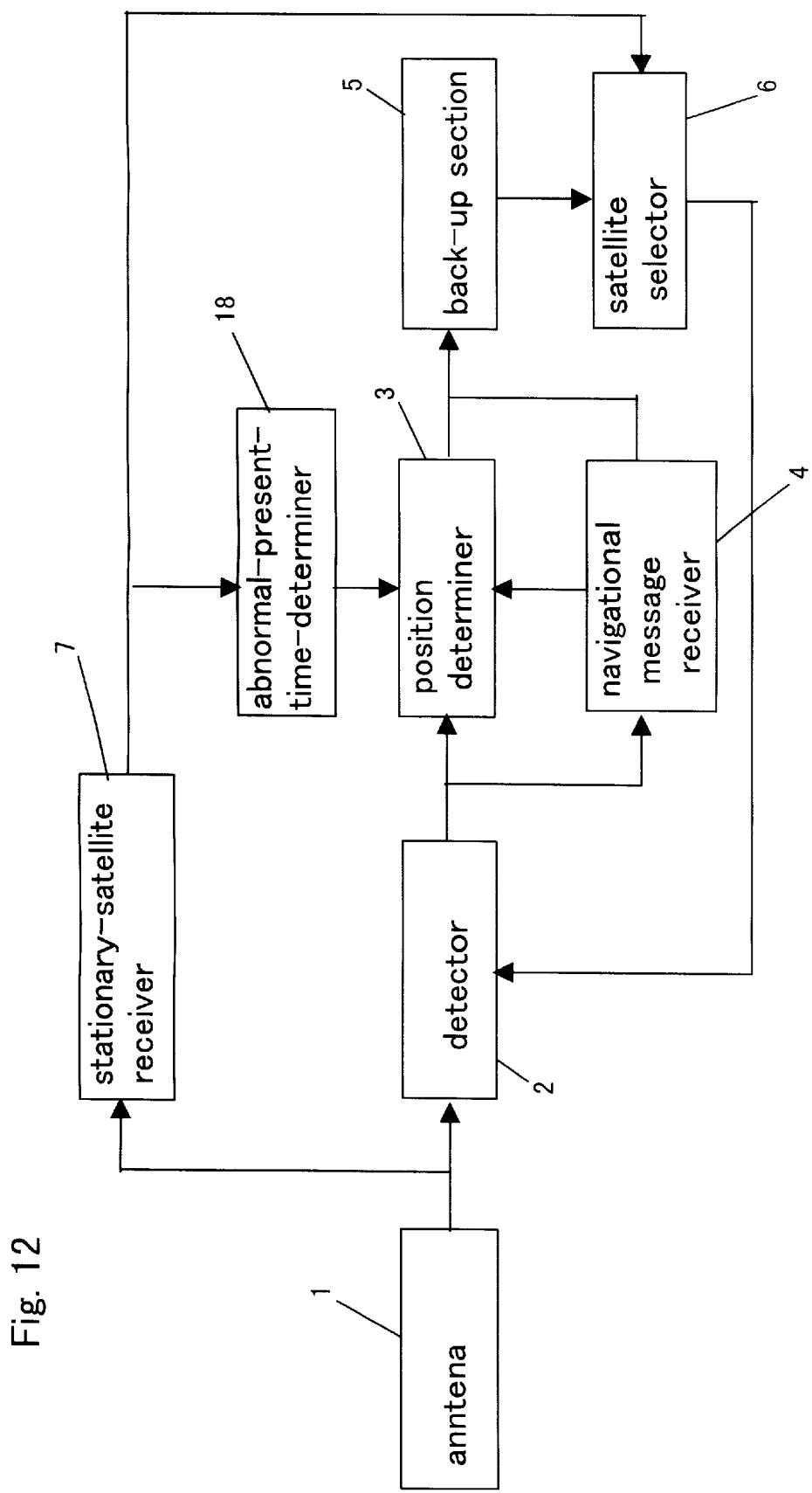
FIG. 12 is a block diagram depicting functions of a GPS receiver in accordance with a 12th exemplary embodiment of the present invention.

FIG. 12 is a block diagram illustrating a structure and functions of the GPS receiver used in the 12th embodiment. The same sections already illustrated in FIG. 11 are denoted with the same reference marks, and the descriptions thereof are thus omitted here. This embodiment differs from the 11th one by providing abnormal-present-time-determiner 18, which compares the present time predicted based on the data from a stationary satellite with another present time found by positional calculation, thereby determining if an abnormality exists.

Position determiner 3 sets up, for each GPS satellite, an equation of a sphere having at its centre a GSP satellite and having as its radius the distance of the respective satellite to the receiver. The position of the receiver is figured out by solving the simultaneous equations. In this case, the time of the receiver is one unknown value, thus this unknown value, i.e. the present time, can be found in the course of figuring out the receiver's position. If the position figured out based on some abnormal data deviates drastically from the true position, the present time, one of the answers of the equations, also deviate correspondingly.

Abnormal-present-time-determiner 18 thus compares the present time predicted by the data from the stationary satellite with another present time found by positional calculation. If the comparison results in a distinct difference, determiner 18 determines that the receiver's position figured out is abnormal, thereby avoiding erroneous measuring.

13. Thirteenth Exemplary Embodiment

A GPS receiver in accordance with the 13th exemplary embodiment finds respective differences between the transmitting times from a stationary satellite and those from GPS satellites. Then the receiver determines that the transmitting times of respective GPS satellite and the stationary satellite are abnormal ones affected by reflection waves and the like when this difference differs from the travelling time found by the method below. Then the receiver stops using those transmitting times for calculating the position.

The method uses the difference of the distances from the receiver to respective GPS satellites and divides this by the speed of light, then the travelling time is found. As a result, this structure avoids erroneous measuring.

Figure 13:
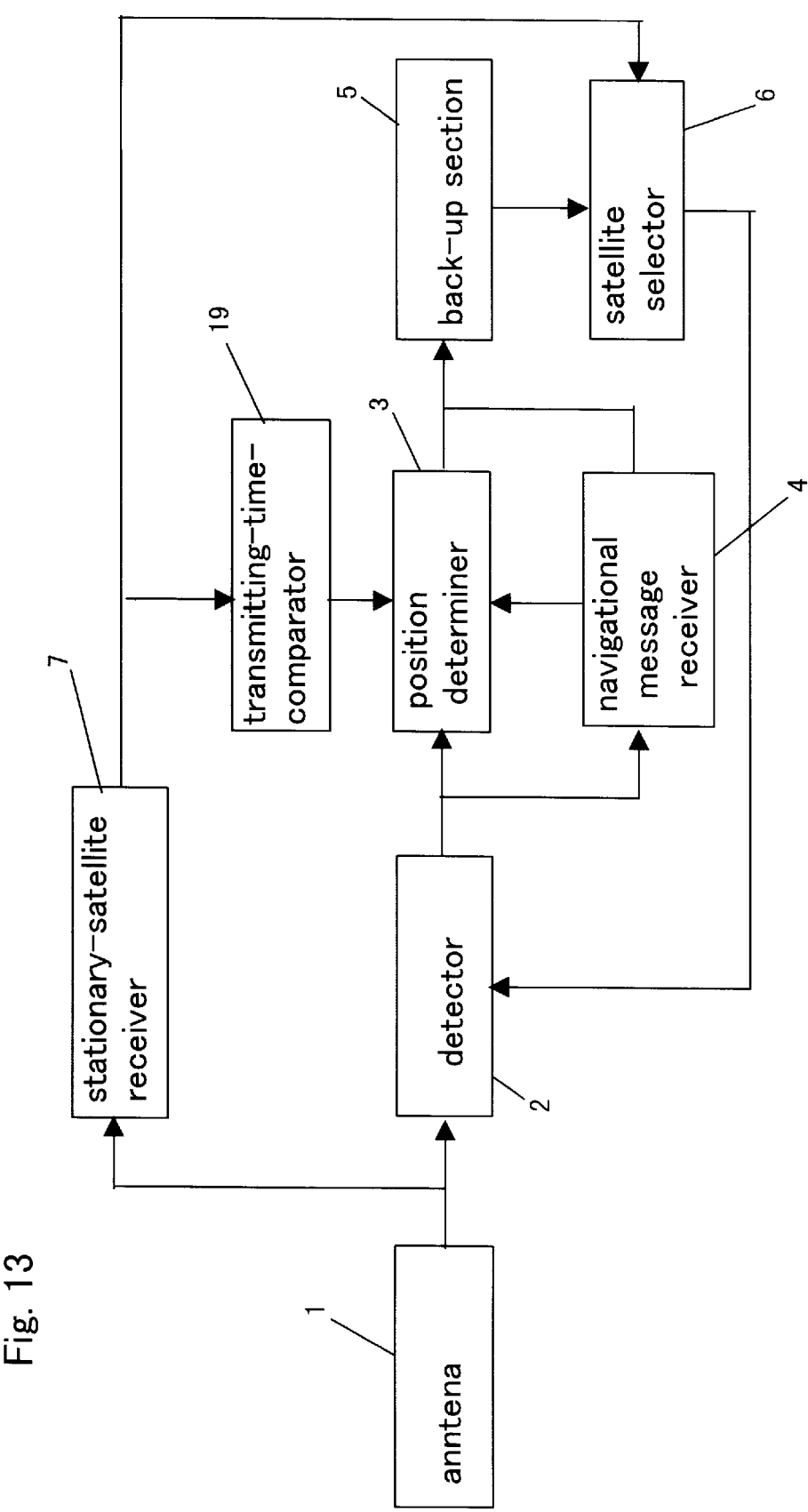
FIG. 13 is a block diagram depicting functions of a GPS receiver in accordance with a 13th exemplary embodiment of the present invention.

FIG. 13 is a block diagram illustrating a structure and functions of the GPS receiver used in the 13th embodiment. The same sections already illustrated in FIG. 1 are denoted with the same reference marks, and the descriptions thereof are thus omitted here. This embodiment differs from the first one by providing transmitting-time-comparator 19, which compares the present time predicted by the data from a stationary satellite with the transmitting time of a GPS satellite.

When a GPS receiver receives a signal from a stationary satellite at a certain time, the time found by the time data received is the transmitting time of the stationary satellite, i.e. prior to the receiving time due to the travelling time. Each GPS satellite also transmits the time data, from which the transmitting time is obtained in the same way, i.e. prior to the receiving time due to its travelling time.

In the case that respective transmitting times of the stationary satellite and the GPS satellite are measured at the same time, the measured transmitting times differ from each other by the span of travelling time. In other words, this difference between the respective measured transmitting times corresponds to the time found from the difference of distances between the receiver's position and the respective positions of the satellites. Transmitting-time-comparator 19 thus compares the transmitting times of the stationary satellite and the respective GPS satellites, and determines that the transmitting times of the respective GPS satellites and the stationary satellite are abnormal ones affected by reflection waves and the like when this difference differs from the travelling time found by the method below. Then the receiver stops using those transmitting times for calculating the position.

The method uses the difference of the distances from the receiver to respective GPS satellites and divides this by the speed of light, then the travelling time is found.

As a result, this structure avoids erroneous measuring.

14. Fourteenth Exemplary Embodiment

A GPS receiver in accordance with the 14th exemplary embodiment determines whether or not the position figured out by a position determiner is valid.

Figure 14:
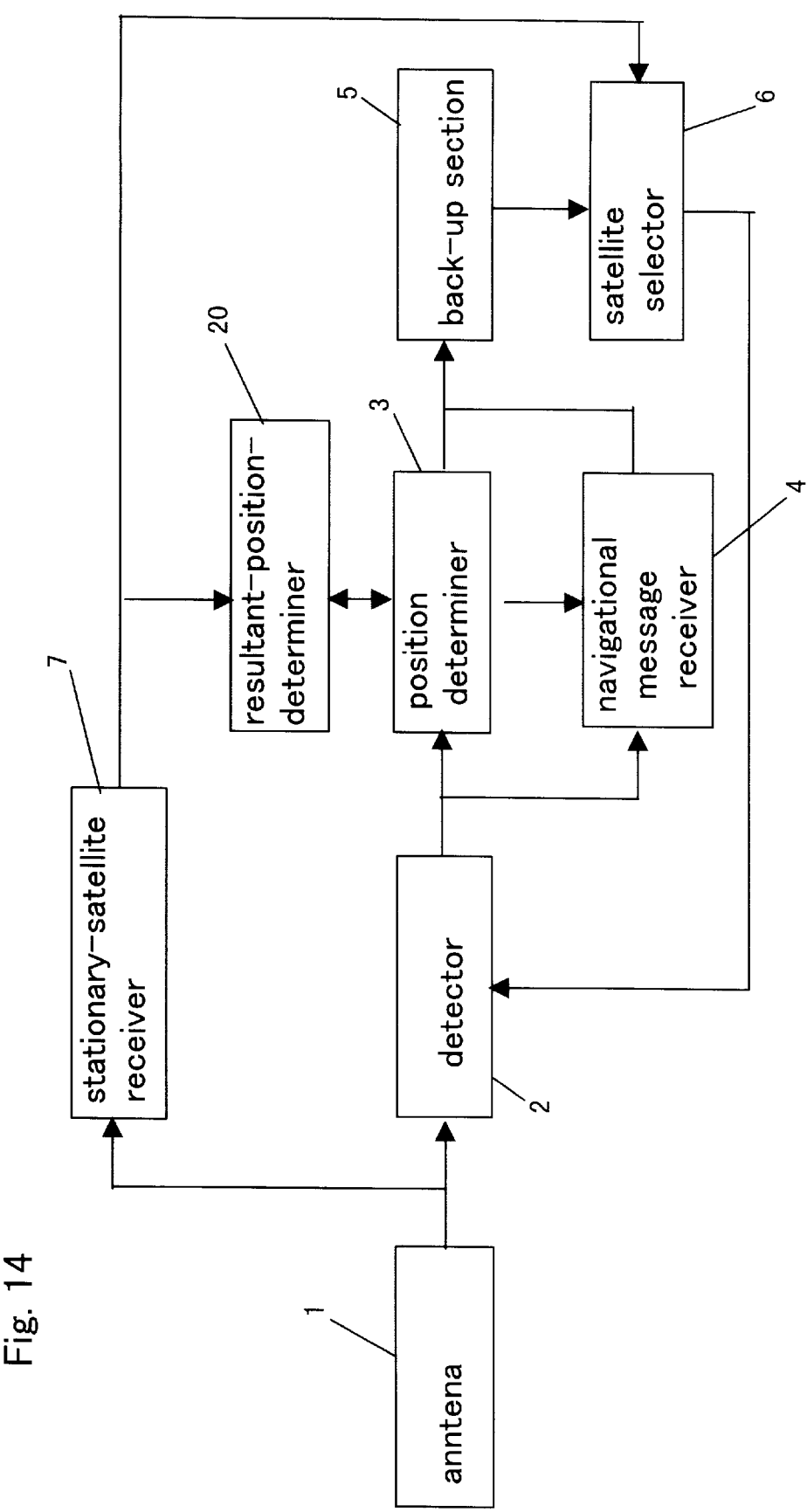
FIG. 14 is a block diagram depicting functions of a GPS receiver in accordance with a 14th exemplary embodiment of the present invention.

FIG. 14 is a block diagram illustrating a structure and functions of the GPS receiver used in the 14th embodiment. The same sections already illustrated in FIG. 1 are denoted with the same reference marks, and the descriptions thereof are thus omitted here. This embodiment differs from the first one by providing resultant-position-determiner 20, which determines whether or not the position figured out by the position determiner is valid.

Position determiner 3 of the GPS receiver uses spheres, each having at their centre a respective satellites' position and each having a radius corresponding to the distance between the receiver and the respective satellites. Then simultaneous equations about these spheres are set up for not less than four satellites. The reason why at least four satellites are required is this: four unknowns must be found, i.e. the three-dimensional position and an error of the receiver's time for measuring the distance between the receiver and the satellites.

Two answers are found from these simultaneous equations, one is not on Earth but somewhere in cosmic space, which is thus determined abnormal instantaneously, thus a position on Earth can be figured out.

When only three satellites to be received are available, the centre of Earth is assumed to be a pseudo fourth satellite for figuring out the position. In this case, both answers are on Earth, and the answer closer to the initial position of the receiver should be the true answer. If the initial position is abnormal for some reason, the resulting measurement outputs a value greatly different from the true position.

A particular stationary satellite is receivable only at a specific area on Earth, therefore, when receiving a signal from that particular stationary satellite, the receiver is to be in the specific area. Resultant-position-determiner 20 thus determines whether or not the stationary satellite is receivable. Only when it is determined receivable, the resultant position is considered valid by position determined 3, and when it is determined not-receivable, the resultant position is invalid. As a result, this structure prevents an abnormal result from being output, and this increases the receiver's reliability.

15. Fifteenth Exemplary Embodiment

A GPS receiver in accordance with the 15th exemplary embodiment gives an initial value to a position determiner when a resultant-position-determiner determines a resultant position abnormal.

FIG. 15 is a block diagram illustrating a structure and functions of the GPS receiver used in the 15th embodiment. The same sections already illustrated in FIG. 14 are denoted with the same reference marks, and the descriptions thereof are thus omitted here. This embodiment differs from the 14th one by providing initial-position-predictor 21, which gives an initial value to position determiner 3 when resultant-position-determiner 20 determines a resultant position abnormal.

Position determiner 3 sets up simultaneous equations of spheres relating to at least four satellites in order to figure out the position of the receiver. These equations are quadratic equations, and require complicated processing for figuring out the position. Therefore, answers are firstly assumed, and simple equations approximating these answers are assumed, then errors involved in the assumed answers are converged. This solution always requires an initial position, and if the initial position is away from the true position, it takes some time before the errors are converged or they may converge to a wrong position.

When resultant-position-determiner 20 determines a resultant position invalid, or when the initial position is unstable for some reason, initial-position-predictor 21 sets a given initial position using the receivable stationary satellite. For instance, when the receiver receives MSAS (a GPS wide-area assisting system in Japan), it is predetermined to set "Tokyo" as the initial position. As a result, the initial position is settable immediately, and this shortens the time for returning from an abnormality.

What is claimed is:

1. A global positioning system (GPS) receiver compromising:
    a detector having an oscillator and a plurality of reception channels;
    a navigational message receiver for analyzing a navigational message transmitted from a GPS satellite and demodulated by said detector;
    a position determiner for acquiring information of a position of said receiver;
    satellite selector for selecting a GPS satellite based on the information of the position of said receiver, based on orbital information and on time information included in the navigational message, and for establishing a frequency range by adding a Doppler-shift frequency due to the moving of the GPS satellite to an offset frequency of said oscillator, and for setting said frequency range as a scanning range having as its center frequency the respective carrier wave frequency of each of said channels of said detector; and
    a stationary satellite receiver for receiving a signal from a stationary satellite and determining the offset frequency of said oscillator even when said receiver is in a power-off mode, thereby reducing the time for locking onto a GPS satellite when said receiver is in a power-on mode.

2. The GPS receiver as defined in claim 1 further comprising:
    a main power source, and
    a second power source for activating said stationary-satellite-receiver when said main power source is turned off.

3. The GPS receiver as defined in claim 2, wherein when said main power source is turned on, said satellite selector establishes the frequency scanning range based on the offsets frequency determined by said stationary satellite receiver.

4. The GPS receiver as defined in claim 1 further comprising an intermittent receiving controller for controlling said stationary-satellite-receiver to operate intermittently.

5. The GPS receiver as defined in claim 4, wherein said intermittent receiving controller operates said stationary satellite receiver periodically, and the change rate of the offset frequency is measured, and an offset frequency at power on is predicted based on the offset frequency most recently measured, and on the change rate of the offset frequency and the elapsed time from an instant when most recently the offset frequency is measured.

6. The GPS receiver as defined in claim 5 further comprising an interval controller for extending the interval of intermittent receptions when the offset-frequency-change-rate acquired by an offset predictor decreases and the stationary satellite not being receivable, and reducing the interval of intermittent receptions when the offset-frequency-change-rate increases.

7. The GPS receiver as defined in claim 1 further comprising an error-prediction-determiner for determining whether or not said stationary satellite receiver predicts the offset frequency of said oscillator, wherein when said error-prediction-determiner determines that the offset frequency is unpredictable, said satellite selector assigns all said channels of said detector to the stationary satellite, and sets different initial values of scanning frequencies for all said channels, wherein said GPS receiver receives the signal from the stationary satellite so that said error-prediction-determiner determines the offset frequency of said oscillator.

8. The GPS receiver as defined in claim 1 further comprising:
    a reference-signal-level-determiner for measuring the signal level from the stationary satellite and determining the level of a signal to be a reference signal; and
    an alarm for alarming a user when the signal level from the stationary satellite has drifted from the reference signal level.

9. The GPS receiver as defined in claim 8, wherein the reference-signal-level is measured in advance, and
    wherein said GPS receiver further compromises a signal-detecting-threshold controller for determining an optimum signal detecting threshold value with respect to the measured reference-signal-level.

10. The GPS receiver as defined in claim 8 further comprising a useful-GPS-satellite-determiner for comparing the reference-signal-level of the stationary satellite, the signal level being acquired by said reference-signal-level-measuring-section, with a signal level from the GPS satellite and determining whether or not the GPS satellite is useful for determining the position of the receiver.

11. The GPS receiver as defined in claim 8, wherein the signal level of the stationary satellite, the signal level being acquired by said reference-signal-level-measuring-section, is stored in a memory, and
    wherein said receiver further comprises a useful-stationary-satellite-determiner for determining that the stationary satellite now locked onto is not to be used for calculating the position of said receiver when the comparison between the signal level from the stationary satellite with the signal level stored in the memory results in a difference.

12. The GPS receiver as defined in claim 1 further comprising a navigational-message-time-predictor for establishing a scanning range of a top recognition pattern of the data transmitted from a GPS satellite based on time data received at said stationary-satellite-receiver.

13. The GPS receiver as defined in claim 1 further comprising a time-predictor for predicting present time using transmitting time identified when a signal from the stationary satellite is received by said stationary satellite-receiver.

14. The GPS receiver as defined in claim 1 further comprising an abnormal-present-time-determiner for comparing time data acquired by receiving a stationary satellite signal as said stationary-satellite-receiver with present time being determined by calculating the position of said receiver, and determining if the present time is abnormal.

15. The GPS receiver as defined in claim 1 further comprising a transmitting-time-comparator for finding a difference between transmitting time of the stationary satellite and that of the GPS satellite,
wherein respective differences between respective travelling times from the stationary satellite and respective GPS satellites are compared to the difference found by said comparator; and when comparisons show a difference, the satellites are prohibited for use in calculating the position of said receiver, wherein the travelling time is found by dividing each distance from said receiver to the stationary satellite and to the respective GPS satellites by the speed of light.

16. The GPS receiver as defined in claim 1 further comprising a resultant-position-determiner for determining whether or not the position determined by said position determiner is valid.

17. The GPS receiver as defined in claim 16 further comprising an initial-position-predictor for providing an initial position to said position determiner using the stationary satellite when said resultant-position-determiner determines the resultant position as being invalid or when the initial position is unstable.

* * * * *

UNITED STATES PATENT AND TRADEMARK OFFICE
CERTIFICATE OF CORRECTION

PATENT NO.   : 6,320,536 B1
DATED        : November 20, 2001
INVENTOR(S)  : Masahiro Sasaki It is certified that error appears in the above-identified patent and that said Letters Patent is hereby corrected as shown below:

<u>Title page,</u>
Item [56], References Cited, should read as follows:

-- FOREIGN PATENT DOCUMENTS
      5-256925    10/1993    Japan. --

Signed and Sealed this

Twentieth Day of August, 2002

*Attest:*

*Attesting Officer*

JAMES E. ROGAN
*Director of the United States Patent and Trademark Office*